(12) United States Patent
Lee et al.

(10) Patent No.: US 9,146,410 B2
(45) Date of Patent: Sep. 29, 2015

(54) METHOD FOR DETECTING CROSSTALK OF LIQUID CRYSTAL DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Mu Gu Lee, Beijing (CN); Yan Wei, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 232 days.

(21) Appl. No.: 13/878,877

(22) PCT Filed: Dec. 23, 2012

(86) PCT No.: PCT/CN2012/087229
§ 371 (c)(1),
(2) Date: Apr. 11, 2013

(87) PCT Pub. No.: WO2013/127234
PCT Pub. Date: Sep. 6, 2013

(65) Prior Publication Data
US 2014/0055161 A1    Feb. 27, 2014

(30) Foreign Application Priority Data
Feb. 29, 2012   (CN) .......................... 2012 1 0050712

(51) Int. Cl.
*G01R 31/26*    (2014.01)
*G02F 1/13*    (2006.01)
(Continued)

(52) U.S. Cl.
CPC .............. *G02F 1/1309* (2013.01); *G09G 3/006* (2013.01); *G09G 3/3611* (2013.01); *G09G 2320/0209* (2013.01)

(58) Field of Classification Search
CPC .......... G09G 2320/0209; G09G 3/006; G09G 3/3611; G02F 1/1309
USPC ..................................................... 324/760.01
See application file for complete search history.

(56) References Cited

U.S. PATENT DOCUMENTS 6,937,313 B2 * 8/2005 Park et al. ...................... 349/149
2006/0285053 A1 12/2006 Jeoung et al.
(Continued)

FOREIGN PATENT DOCUMENTS

| CN | 1881060 A | 12/2006 |
| CN | 1904992 A | 1/2007 |

(Continued)

OTHER PUBLICATIONS

First Chinese Office Action dated Feb. 18, 2014; Appln. No. 201210050712.5.
(Continued)

*Primary Examiner* — Melissa Koval
*Assistant Examiner* — Daniel Miller
(74) *Attorney, Agent, or Firm* — Ladas & Parry LLP

(57) ABSTRACT

An embodiment of the present invention discloses a method for detecting crosstalk of a liquid crystal display panel, involving detection on a liquid crystal display panel for defect of special crosstalk of the liquid crystal display panel. The method comprises: inputting signals into the liquid crystal display panel to be detected so that a detection pattern is displayed on the liquid crystal display panel to be detected; a gray-scale value for all the pixels in an intermediate region is 0; in other regions a gray-scale value for all the pixels in first pixel groups is the same, a color and gray-scale value for all the pixels in second pixel groups are the same, and the gray-scale value for all the pixels in the second pixel groups differs from that for all the pixels in the first pixel groups; the first pixel groups and the second pixel groups are same in shape, and both are distributed alternatively in both transverse and longitudinal directions in the other regions.

14 Claims, 3 Drawing Sheets

(51) Int. Cl.
*G09G 3/00* (2006.01)
*G09G 3/36* (2006.01)

(56) References Cited

U.S. PATENT DOCUMENTS

2008/0203394 A1   8/2008   Kwok et al.
2009/0072233 A1   3/2009   Hayashi et al.

FOREIGN PATENT DOCUMENTS

| CN | 101145564 A | 3/2008 |
| CN | 101467257 A | 6/2009 |
| CN | 102214700 A | 10/2011 |
| CN | 102263985 A | 11/2011 |
| CN | 102629003 A | 8/2012 |
| CN | 102651455 A | 8/2012 |

OTHER PUBLICATIONS

International Search Report; mailed Mar. 21, 2013; PCT/CN2012/087229.

International Preliminary Report on Patentability dated Sep. 2, 2014; PCT/CN2012/087229.

* cited by examiner

METHOD FOR DETECTING CROSSTALK OF LIQUID CRYSTAL DISPLAY PANEL

TECHNICAL FIELD

Embodiments of the present invention relate to a method for detecting crosstalk of a liquid crystal display panel.

BACKGROUND

In manufacturing a TFT-LCD (thin film transistor-liquid crystal display), one very important step is to detect crosstalk. If a defect of crosstalk (that is, a display defect caused by crosstalk) is detected; improvements on design or procedure must be carried out until the defect of crosstalk is eliminated or weakened.

At present, in detecting crosstalk of a liquid crystal display panel, as shown in FIG. 3, a relatively common detection pattern always typically sets the gray-scale value of all the pixels in the intermediate region thereof to 0 (i.e., black L0) and sets the color and gray-scale value for all the pixels in other regions to be the same. On the liquid crystal display panels using such a detection pattern, it can be determined that crosstalk occurs in the liquid crystal display panel if there occurs the case where the brightness in the horizontal direction (or vertical direction) region in the intermediate region is greater than that in the other regions; otherwise, the liquid crystal display panel has a good performance while has no crosstalk.

Although the above detecting method can detect out a part of defects of crosstalk in the liquid crystal display panel, the defects of crosstalk caused by some special circumstances (for example, design modification, technological condition modification or the changes of raw materials etc., that is, special kinds of defects of crosstalk, still can not be detected.

SUMMARY

An embodiment of the present invention provides a method for detecting crosstalk of a liquid crystal display panel, used for detecting imperfect situations of special crosstalk in a liquid crystal display panel.

One embodiment of the present invention provides a method for detecting crosstalk of a liquid crystal display panel, comprising: inputting signals into the liquid crystal display panel to be detected so that a detection pattern is displayed on the liquid crystal display panel to be detected; a gray-scale value for all the pixels in an intermediate region is 0; in other regions than the intermediate region, a gray-scale value for all the pixels of first pixel groups is the same, a color and gray-scale value for all the pixels in second pixel groups are the same, and the gray-scale value for all the pixels in the second pixel groups differs from the gray-scale value for all the pixels in the first pixel groups; the first pixel groups and the second pixel groups are the same in the shape, and are distributed alternatively in both transverse and longitudinal directions in the other regions.

As to this method, for example, the gray-scale value for all the pixels in the first pixel groups is 0 or 255, while the gray-scale value for all the pixels in the second pixel groups is not 0 or 255.

The method provided by the embodiment of the present invention allows for the detection on defects of special crosstalk in a liquid crystal display panel, by making the liquid crystal display panel to be detected present the above-mentioned detection pattern.

BRIEF DESCRIPTION OF THE DRAWINGS

A general introduction of the drawings for embodiments will be made following to afford a more clear description of the technical solution of the embodiment of the present invention, and obviously, the drawings in the following description is only related to some embodiments of the present invention, rather than limitative to the present invention.

Figure 1:
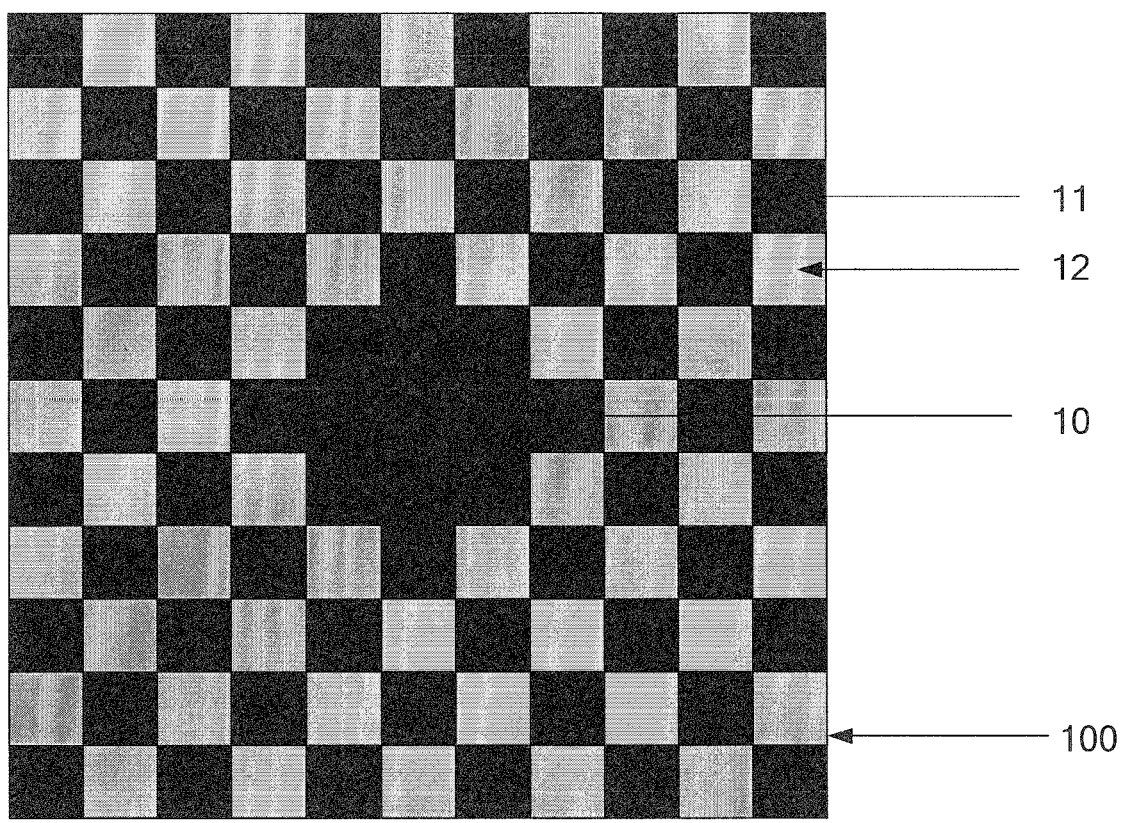
FIG. 1 is a first schematic view showing the detection pattern used in the method for detecting crosstalk in a liquid crystal display panel provided by an embodiment of the present invention.

REFERENCE NUMERALS 100- detection pattern; 10- intermediate region,
11- the first pixel group, 12- the second pixel group.

DETAILED DESCRIPTION

To make clearer the aim, technical solutions and advantages of the embodiments of the present invention, a clear and complete description about the technical solution of the embodiment of the present invention will be made with reference to the accompanying drawings of the embodiments of the present invention. Obviously, the described embodiments are merely part of the embodiments of the present invention, but not all the embodiments. Based on the described embodiments of the present invention, all the other embodiments acquired by the ordinary skilled in this art, without any creative labor, fall into the protective scope of the present invention.

Unless otherwise defined, the technical terms or scientific terms used herein should have common meanings to be understood by the ordinary skilled in this art of the present invention. The wordings such as "first", "second" and the like used in the patent application specification as well as claims of the present invention do not mean any sequence, quantity or importance, but are solely used to distinguish different components. Similarly, the terms such "a", "an", "the", and the like do not mean quantitative restriction, but mean the existence of at least one object. The wordings such as "comprising" or "being composed of" etc intend to mean that the elements or articles before the words "comprise" or "include" encompass the elements or articles listed after the words "comprise" or "include" as well as its equivalent, but do not exclude other elements or articles. The terms "on", "under", "left", "right" etc are used only to indicate relative positional relationship, and when the absolute position of an object to be described varies, the relative positional relationship may also vary accordingly.

One embodiment of the present invention provides a method for detecting crosstalk in a liquid crystal display panel, as described in the following.

Firstly, signals are inputted into the liquid crystal display panel to be detected, so that a detection pattern is presented on the liquid crystal display panel to be detected. For example, the input signals may be inputted to the gate lines and the data lines of the liquid crystal panel through a gate driver and a data driver, respectively.

Figure 2:
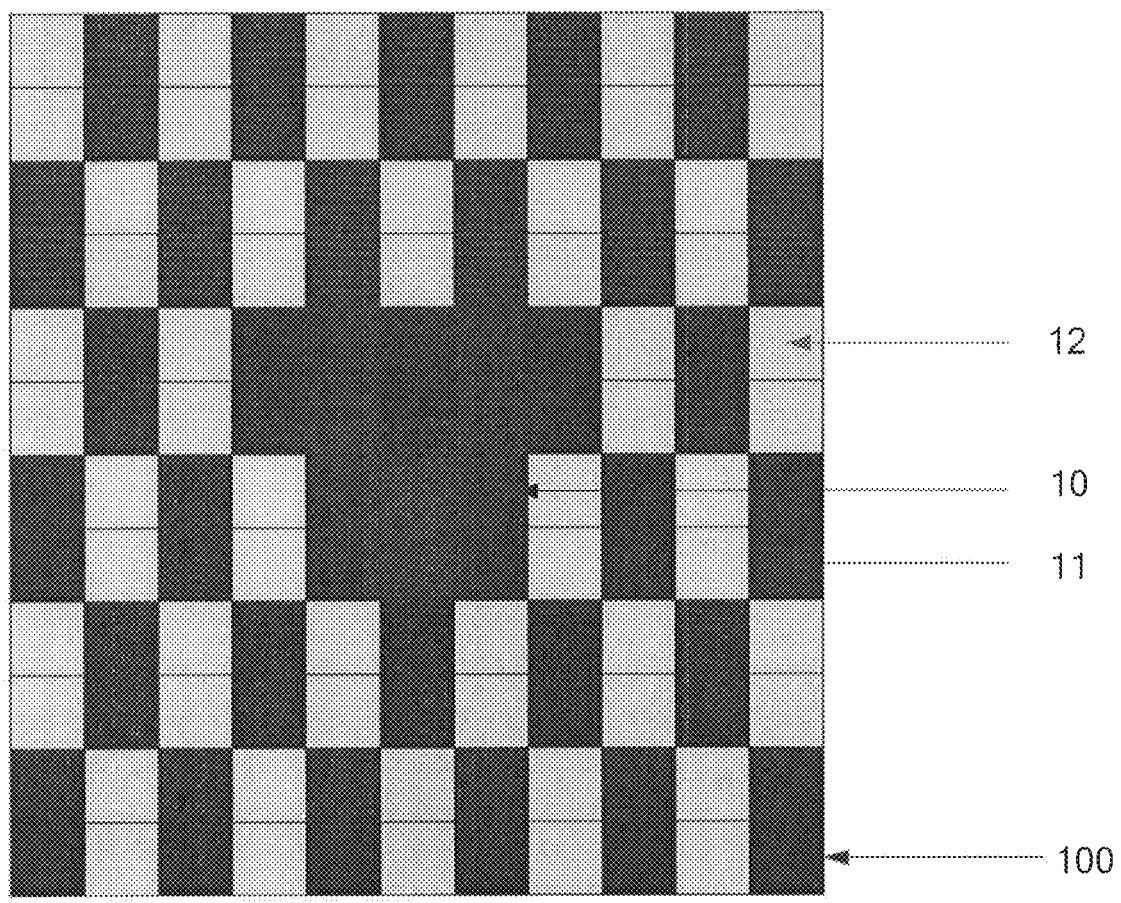
FIG. 2 is a second schematic views showing the detection pattern used in the method for detecting crosstalk in a liquid crystal display panel provided by an embodiment of the present invention.
Figure 3:
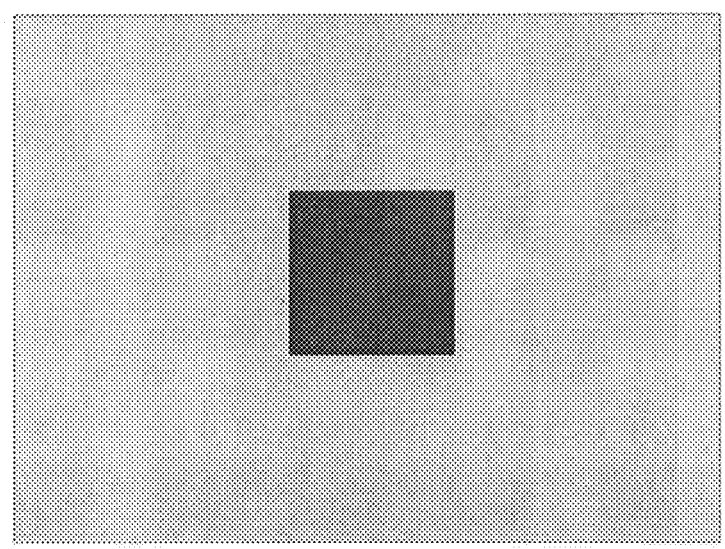
FIG. 3 is a schematic view showing the detection pattern used in the method for detecting crosstalk in a liquid crystal display panel in prior art.

With reference to FIG. 1 or 2, the whole detection pattern can be divided into three kinds of pixel areas 11, 11 and 12. The gray-scale value for all the pixels in the intermediate region 10 of the detection pattern 100 is 0; the gray-scale value for all the pixels in the first pixel groups 11 of the other regions than the intermediate region is the same; the color and the gray-scale value for all the pixels in the second pixel groups 12 are the same, and this gray-scale value differs from the gray-scale for all the pixels of the first pixel groups 11.

Each pixel comprises for example a plurality of sub-pixels, each of which corresponds to one primary color, for example three sub-pixels, each sub-pixel corresponding to red (R), green (G), blue (B) respectively, or four sub-pixels, each sub-pixel corresponding to cyan (C), magenta (M), yellow (Y), black (B).

The first pixel groups 11 and the second pixel groups 12 are same as each other in shape, and both are distributed alternatively in both the transverse and longitudinal directions in other regions than the intermediate region 10. Here the phrase "same in shape" means the shapes of the first pixel groups 11 and the second pixel groups 12 are identical or similar to each other.

Further, when the gray-scale value is represented in a 8-bit data in the display device, the magnitude thereof is 0~255; in this case, the gray-scale value for all the pixels in the first pixel groups 11 is 0 or 255, while the gray-scale value for all the pixels in second pixel groups 12 is not 0 or 255. For example, when the gray-scale value for all the pixels in the first pixel groups 11 is 0, the gray-scale value for all the pixels in the second pixel groups is not 0; when the gray-scale value for all the pixels in the first pixel groups 11 is 255, the gray-scale value for all the pixels in the second pixel groups is not 255.

In the display device, the gray-scale value may also be represented in other ways, for example, in a 16-bit or 24-bit data. When the gray-scale value is represented in a 16-bit data, the magnitude thereof is 0~65536.

It should be noted that the intermediate region 10 is only a relatively small region in the detection pattern 100, which region may be located at the right center of the detection pattern 100, or may be located at a relatively upward, downward, leftward, rightward position with respect to the right center, that is, the location at the right center is not necessary. The present invention is not limited thereto.

Here, for example, the liquid crystal panel (or displaying area thereof) comprises gate lines and data lines orthogonally intersecting with each other. The transverse and longitudinal directions refer to the long-axis directions of the gate lines and the data lines respectively; generally, the long-axis direction of the gate line is referred to the transverse direction, and the long-axis direction of the data lines is referred to the longitudinal direction. Of course, it's also applicable that the long-axis direction of the data line data lines is referred to the transverse direction and the long-axis direction of the gate lines is referred to the longitudinal direction. That the first pixel groups 11 and the second pixel groups 12 are distributed alternatively in the transverse and longitudinal directions of the other regions means that the first pixel groups and the second pixel groups are distributed alternatively in the transverse direction and also in the longitudinal direction.

In the embodiment of the present invention, the description is conducted by taking as an example that a pixel each comprises red, green, blue sub-pixels, and the color of all the pixels in the second pixel groups 12 may be presented in green, red, blue or white. Preferably, the color of all the pixels in the second pixel groups 12 is presented in green, which case is in favor of identification by eyes, more readily to discern the defects caused by crosstalk of the liquid crystal display panel. It should be noted that green, red, and blue each are a kind of monocolor, while white is a composite color of green, red, and blue. In the embodiment of the present invention, white has a gray-scale value; for example, white has a gray-scale value of 127 and is in fact shown in gray; however, in the embodiment of the present invention, white of a gray-scale value of 127 is referred to white L127, where the letter 'L' represents gray-scale value. In the case where the gray-scale value is in a range of 0~255, usually RGB=0:0:0 represents black, and RGB=255:255:255 represents pure white.

Based on the above description on colors, in this embodiment, it's further preferred that the gray-scale value for all the pixels in the second pixel groups 12 may be any value within the range of 100~150; of course, it's also possible to select another gray-scale value without this range in practice. Further preferred, the gray-scale value for all the pixels of the second pixel groups 12 may be an value within the range of 125~130. Still further preferred, the gray-scale value for all the pixels in the second pixel groups 12 is 127. Also, it's also beneficial for the identification by eyes, further optimizing the technical solution of the embodiment of the present invention.

In the embodiment of the present invention, the preferred selection for color and preferred selection for gray-scale value can be combined together to obtain a more preferred selection in which for all the pixels in the second pixel groups 12 the color is green and the gray-scale value is 127. Of course, as described above, the embodiment of the present invention may further employ a plurality of implementations.

Next, further detailed description will be given on the first pixel groups 11 and second pixel groups 12 distributed alternatively in the detection pattern 100 which is used in the method for detecting crosstalk of a liquid crystal display panel in connection with FIGS. 1 and 2.

Optionally, as shown in FIG. 1, the first pixel groups 11 and the second pixel groups 12 are separated from each other by one pixel in both the row and column directions (that is, both the transverse and longitudinal directions). It should be noted that, as described above, the first pixel groups 11 and second pixel groups 12 are distributed alternatively, and therefore, with reference to FIG. 1, the first pixel groups 11 and second pixel groups 12 are both separated from each other by one pixel in both the row and column directions in this embodiment, such that each pixel in the first pixel groups 11 is surrounded by the pixels in the second pixel groups 12 in four directions, that is, the upward, downward, leftward, rightward directions, while each pixel in the second pixel groups 12 is surrounded by the pixels in the first pixel groups 11 in four directions, that is, the upward, downward, leftward, rightward directions.

Optionally, as shown in FIG. 2, the first pixel groups 11 and the second pixel groups 12 each contains two pixels in two rows but one column or in two columns but one row; that is, the first pixel groups 11 and the second pixel groups 12 are separated from each other by two pixels in one of the row and column directions, while separated from each other by one pixel in the other of the row and column directions. It should be noted that, as described above, the first pixel groups 11 and second pixel groups 12 are distributed alternatively; therefore with reference to FIG. 2, the two pixels in two rows but one column contained in the first pixel groups 11 and that contained in the second pixel groups 12 are distributed alternatively in this embodiment. In the embodiment of the present invention, the first pixel groups 11 and second pixel groups 12 may be distributed in another modes, for example, a mode where the groups 11 and 12 are separated by two pixels in both the row and column directions, or a mode where the groups 11 and 12 are separated by three pixels in one of the row and column directions while are spaced by one pixel in the other of the row and column directions. The present invention is not limited thereto.

The embodiment of the present invention provides a method for detecting crosstalk of a liquid crystal display panel, which makes the liquid crystal display panel to be detected present for example the detection pattern 100 shown in either of the above FIGS. 1 to 2, enabling the detection on special crosstalk defects in a liquid crystal display panel. Specifically, detailed description can be made with reference to the schematic diagram as shown in FIG. 4.

Figure 4:
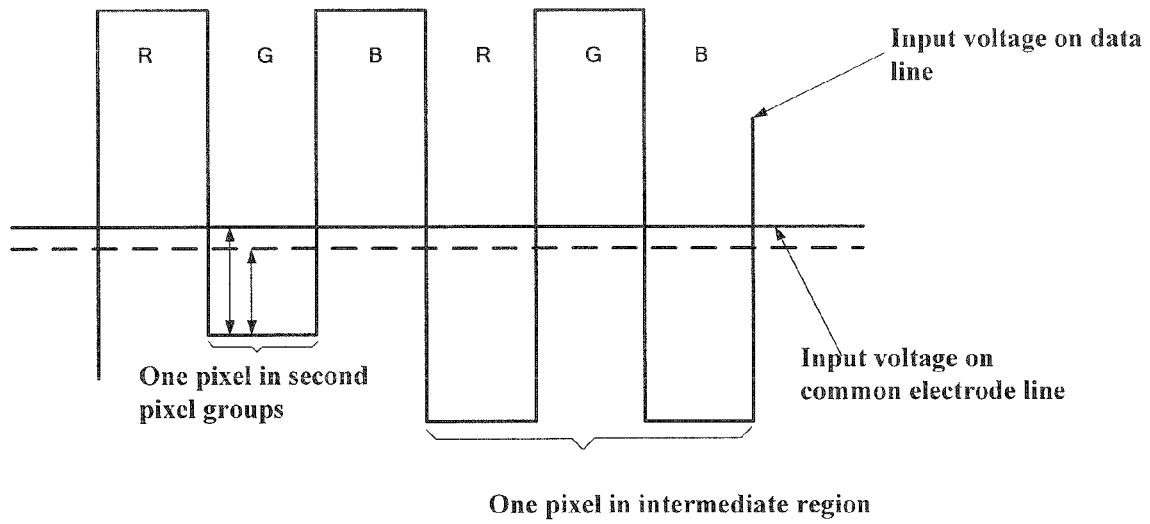
FIG. 4 is a diagram showing the principle of the method for detecting crosstalk in a liquid crystal display panel in a normal-white mode provided by an embodiment of the present invention.

In FIG. 4, when the detection pattern is presented, the voltage value of one pixel in the intermediate region 10 (the voltage value of pixel electrode of three sub-pixels of this pixel) and the voltage value of one pixel in the second pixel groups 12 within the other regions (the voltage value of the pixel electrode of three sub-pixels of this pixel) are compared. In this drawing, the case where the color of one pixel in the second pixel groups 12 is green is taken as an example, and here, the other regions than the intermediate region can be referred to a green region.

The following description is illustrated by taking the liquid crystal display in a normal-white mode as an example. The normal-white mode is such a mode in which light from a backlight can all transmit through the liquid crystal panel when a driving voltage is not applied, while a part of or none of light from the backlight can transmit through the liquid crystal panel when a driving voltage is applied. Where one pixel consists of three sub-pixels, i.e., red, green, blue sub-pixels, the presented color of one pixel is determined in combination by the input signals over the data lines corresponding to the three sub-pixels, i.e., the red, green, blue sub-pixels. In order to display the detection pattern 100 as shown in either FIG. 1 or 2; in FIG. 4, the pixel electrodes of the three sub-pixels of the one pixel in the intermediate region 10 is applied with a peak voltage; as the one pixel within the second pixel groups 12 in the green region presents in a green color, the pixel electrodes of the red and blue sub-pixels of this pixel are both applied with a peak voltage (at this time, the light transmittance at the red and blue sub-pixels is at the lowest value, and accordingly the gray-scale values in the regions of the red and blue sub-pixels is 0), and the voltage value of the pixel electrode of the green sub-pixel is less than the peak voltage. The middle solid line in FIG. 4 represents the input voltage at the common electrode, while the middle dotted line represents the actual voltage after a certain voltage drop occurs at the common electrode when the detection pattern is presented. It should be noted that the two pixels in FIG. 4 are the pixels on the same row.

The smaller the voltage difference between the common electrode and the pixel electrode of one green sub-pixel in the green region is, the part of the green region parallel to the intermediate region will be presented brighter compared with other parts of the green regions (that is, abnormal display) in the presented detection pattern during the detection procedure. In the procedure of detecting whether the defect of crosstalk exists, the existing detection pattern can also be used to cause a certain voltage drop at the common electrode line so as to reduce the voltage difference between the pixel electrode and common electrode, however the decreased voltage difference, which occurs when the prior detection pattern is used to detect the special crosstalk, can not make the degree of abnormal display sufficient to be identified by human eyes. However, with the detection pattern according to the embodiment of the present invention, a greater voltage drop can be created at the common electrode line, this is, resulting in smaller voltage difference between the pixel electrode and common electrode line, which makes the phenomenon of the abnormal display more notable and thereby enables the liquid crystal display panel suffering crosstalk to be discerned by human eyes. Next, the advantage of the technical solution provided by the embodiment of the present invention over the existing technical solution is illustrated with data. These data are the detection results obtained from a liquid crystal display panel having special crosstalk defect with different detection patterns.

|  | A1 | A2 | A3 |
|---|---|---|---|
| IDD | 528.5 mA | 763 mA | 790.7 mA |

A1 refers to the existing detection pattern, in which the gray-scale value for all the pixels in the intermediate region thereof is 0, while all the pixels in other regions are the white L127 (it should be noted, for the convenience of comparison, the gray-scale value 127 is employed to be consistent with A2, A3).

A2 refers to the detection pattern 100 as shown in FIG. 1, in which the gray-scale value for all the pixels in the intermediate region 10 is 0; both the first pixel groups 11 and the second pixel groups 12 in the other regions contain pixels separated by one line in both the row and column directions, and the gray-scale value for all the pixels in the first pixel groups 11 is 0, the color for all the pixels of the second pixel groups 12 is green, and the gray-scale value for all the pixels of the second pixel groups 12 is 127.

A3 refers to the detection pattern 100 as shown in FIG. 2, where the gray-scale value for all the pixels in the intermediate region 10 is 0; both the first pixel groups 11 and the second pixel groups 12 in other regions contain two pixels arranged in two rows but one column, and the gray-scale value for all the pixels in the first pixel groups 11 is 0, the color for all the pixels of the second pixel groups 12 is green, and the gray-scale value for all the pixels of the second pixel groups 12 is 127.

IDD represents the operation current all over the liquid crystal display panel when the liquid crystal display panel to be detected presents the above three detection patterns thereon.

Apparently, the IDD corresponding to the detection pattern of A1 is less than the IDD corresponding to the detection pattern 100 of A2; and the IDD corresponding to the detection pattern 100 of A1 is also less than the IDD corresponding to the IDD corresponding to the detection pattern of A3.

Figure 5:
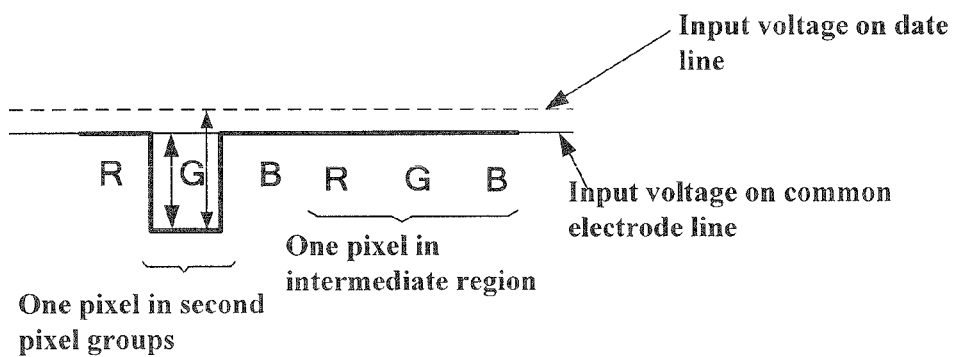
FIG. 5 is a diagram showing the principle of the method for detecting crosstalk in a liquid crystal display panel in a normal-black mode provided by an embodiment of the present invention.

Since the greater IDD indicates the greater load of the liquid crystal display panel to be detected, which causes greater voltage drop at the common electrode line; thus the situation occurs in which the liquid crystal display panel to be detected presents a higher brightness in the intermediate region in the horizontal direction than in the other regions, that is, it's more easy to discern the special crosstalk defect, which can not be detected by the existing technology, of the liquid crystal display panel. Similarly, as to the liquid crystal display in a normal-black mode, the above method may also be carried out for detecting. The normal-black mode is such a mode in which light from a backlight can not transmit through the liquid crystal panel when a driving voltage is not applied, while a part of or all of the light from the backlight can transmit through the liquid crystal panel when a driving voltage is applied. Then, in order to present the detection pattern 100 as shown in, for example, any one of FIGS. 1 and 2, in FIG. 5 the pixel electrodes of the three sub-pixel of one pixel in the intermediate region 10 are applied with a minimum voltage, and because the one pixel in the second pixel groups 12 presents a complementary color of green, the pixel electrodes of the red, blue sub-pixels of this pixel are applied with a minimum voltage (that is, the gray-scale value in the red and blue sub-pixel regions is 0), and the voltage value at the pixel electrode of the green sub-pixel is less than the peak voltage. The middle solid line in FIG. 5 represents the input voltage at the common electrode line, while the middle dotted line represents the actual voltage after a certain variation occurs at the common electrode line when the detection pattern is presented. It should be noted that the two pixels in FIG. 5 are the pixels on the same row. The greater the voltage difference between the common electrode and the pixel electrode of one green sub-pixel in the region of the complementary color of green is, the part of the region parallel to the intermediate region will be presented brighter compared with the other part of the region (that is, abnormal display) in the presented detection pattern during the detection procedure. Thus, the detection under the normal-black mode can be realized.

The above is only exemplary embodiments of the present invention, not intending to limit the protective scope of the present invention; the protective scope of the present invention is defined by the appended claims.

The invention claimed is:

1. A method for detecting crosstalk of a liquid crystal display panel by using a detection pattern, comprising:
   inputting signals into the liquid crystal display panel to be detected so that a detection pattern is displayed on the liquid crystal display panel to be detected;
   wherein a gray-scale value for all the pixels in an intermediate region of the detection pattern is 0; and in other regions than the intermediate region, a gray-scale value for all the pixels of first pixel groups is the same, a color and gray-scale value for all the pixels in second pixel groups are the same, and the gray-scale value for all the pixels in the second pixel groups differs from the gray-scale value for all the pixels in the first pixel groups;
   detecting the crosstalk based on the relative brightness between the intermediate region and the other regions; and
   wherein the first pixel groups and the second pixel groups are same in shape, and both are distributed alternatively in both transverse and longitudinal directions in the other regions.

2. The method according to claim 1, wherein the gray-scale value for all the pixels in the first pixel groups is 0 or 255, and the gray-scale value for all the pixels in the second pixel groups is between 0 and 255.

3. The method according to claim 1, wherein, in both row and column directions, the first pixel groups and the second pixel groups are separated from each other by one pixel.

4. The method according to claim 1, wherein the first pixel groups and the second pixel groups are separated from each other by two pixels in one of row and column directions, while are separated from each other by one pixel in the other of the row and column directions.

5. The method according to claim 1, wherein the color of all the pixels in the second pixel groups is in any one of red, green, blue or white.

6. The method according to claim 5, wherein the gray-scale value for all the pixels in the second pixel groups is any value in the range of 100-150.

7. The method according to claim 5, wherein the gray-scale value for all the pixels in the second pixel groups is an value in the range of 125-130.

8. The method according to claim 5, wherein the gray-scale value for all the pixels in the second pixel groups is 127.

9. The method according to claim 2, wherein, in both row and column directions, the first pixel groups and the second pixel groups are separated from each other by one pixel.

10. The method according to claim 2, wherein the first pixel groups and the second pixel groups are separated from each other by two pixels in one of row and column directions, while are separated from each other by one pixel in the other of the row and column directions.

11. The method according to claim 2, wherein the color of all the pixels in the second pixel groups is in any one of red, green, blue or white.

12. The method according to claim 11, wherein the gray-scale value for all the pixels in the second pixel groups is any value in the range of 100-150.

13. The method according to claim 11, wherein the gray-scale value for all the pixels in the second pixel groups is an value in the range of 125-130.

14. The method according to claim 11, wherein the gray-scale value for ail the pixels in the second pixel groups is 127.

* * * * *